(12) United States Patent
Haberman

(10) Patent No.: US 7,310,472 B2
(45) Date of Patent: Dec. 18, 2007

(54) CABLE GUIDE AND SYSTEM FOR MAINTAINING A DESIRED BEND RADIUS

(75) Inventor: Thomas William Haberman, Pima, AZ (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 11/013,520

(22) Filed: Dec. 15, 2004

(65) Prior Publication Data

US 2006/0127025 A1 Jun. 15, 2006

(51) Int. Cl.
*G02B 6/00* (2006.01)

(52) U.S. Cl. .............. 385/137; 385/100; 385/134; 385/135; 385/136

(58) Field of Classification Search .......... 385/100, 385/99, 134, 135, 136, 137, 138
See application file for complete search history.

(56) References Cited

U.S. PATENT DOCUMENTS

| | | | |
|---|---|---|---|
| 4,652,082 A | 3/1987 | Warner | 350/96.2 |
| 5,037,175 A | 8/1991 | Weber | 385/76 |
| 5,347,603 A | 9/1994 | Belenkiy et al. | 385/86 |
| 5,640,476 A | 6/1997 | Womack et al. | 385/86 |
| 5,710,851 A | 1/1998 | Walter et al. | 385/86 |
| 6,049,040 A * | 4/2000 | Biles et al. | 174/68.3 |
| 6,134,370 A | 10/2000 | Childers et al. | 385/135 |
| 6,554,489 B2 | 4/2003 | Kent et al. | 385/86 |
| 2002/0079697 A1* | 6/2002 | Griffioen et al. | 285/123.1 |

* cited by examiner

*Primary Examiner*—Brian M. Healy
(74) *Attorney, Agent, or Firm*—Kunzler & McKenzie

(57) ABSTRACT

A cable guide and system are disclosed for maintaining a desired bend radius. The cable guide includes two substantially curved tube halves, each tube half comprising a curved portion having a predetermined radius. The cable guide also includes a hinge joining the tube halves and a fastening member configured to fasten the tube halves together. A first end of each of the tube halves is shaped to adhere to a cable connector. The cable connector terminates a cable. The tube halves have an open configuration and a closed configuration. When in the closed configuration, the tube halves are fastened together by the fastening member. In the closed configuration, the tube halves form a tubular sleeve. The tubular sleeve includes a lumen through which a cable may extend.

20 Claims, 5 Drawing Sheets

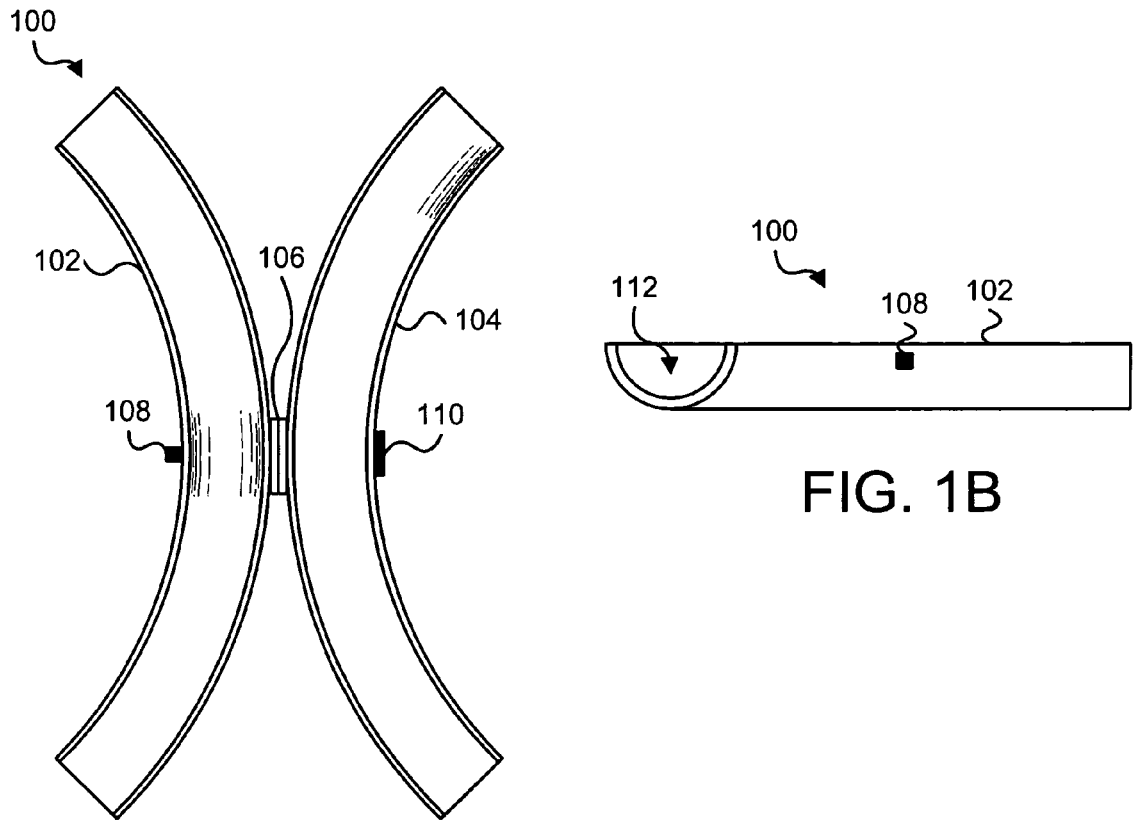
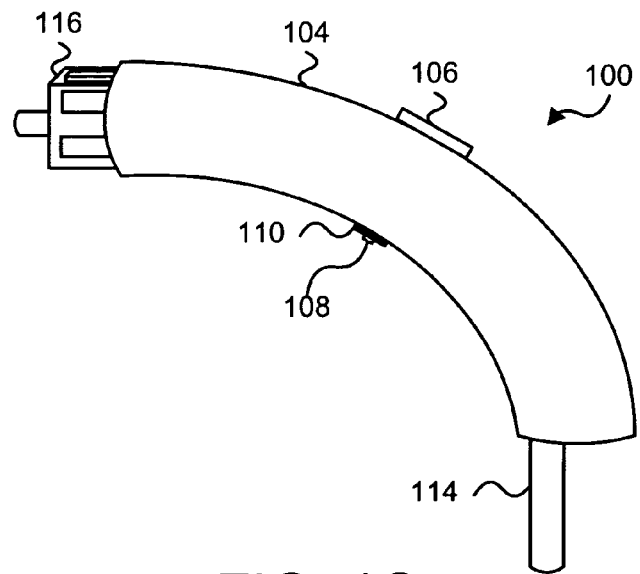

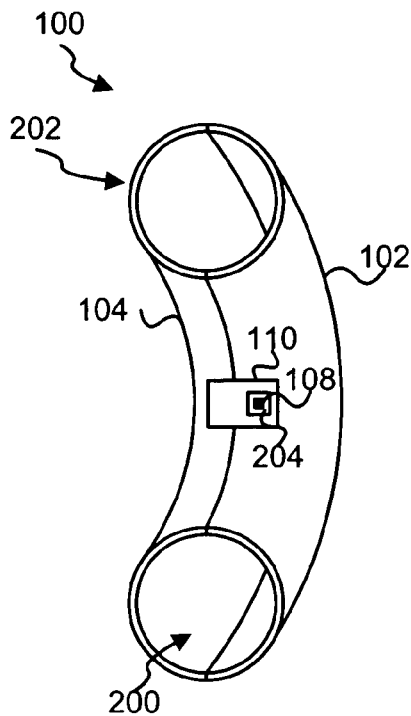
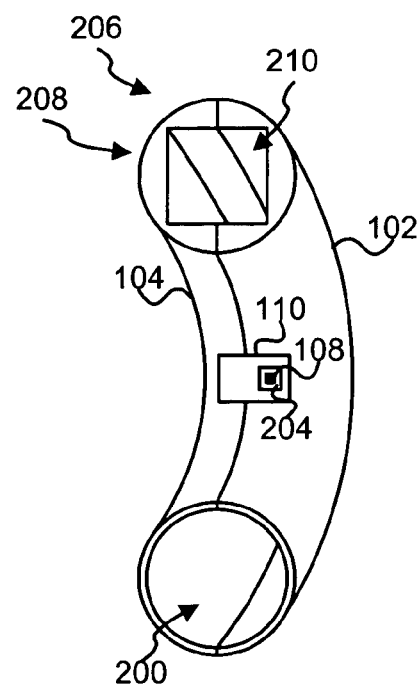
FIG. 2A     FIG. 2B
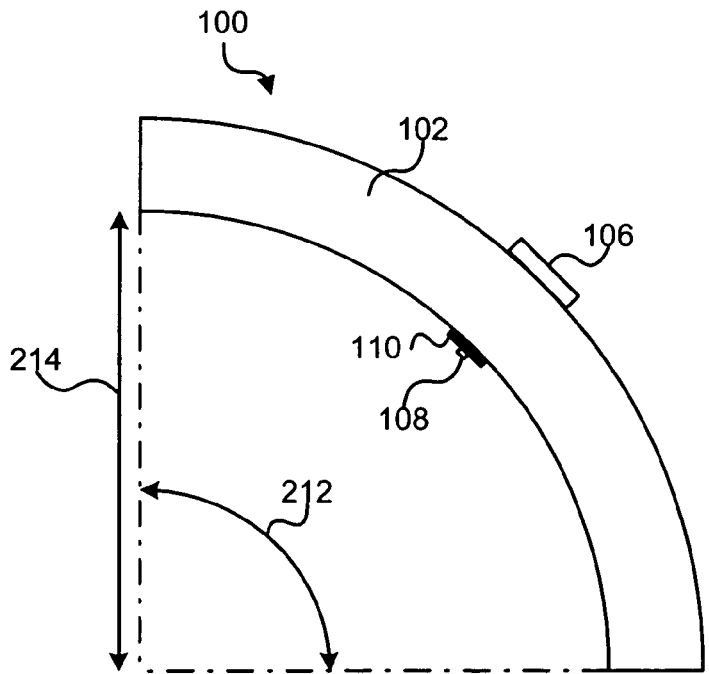
FIG. 2C

CABLE GUIDE AND SYSTEM FOR MAINTAINING A DESIRED BEND RADIUS

BACKGROUND OF THE INVENTION

1. Field of the Invention

This invention relates to cable management devices and more particularly relates to cable guides used to maintain a desired bend radius for a cable.

2. Description of the Related Art

An important part of a telecommunications system is the plurality of cables that conduct signals between nodes of a network. Many of the cables conduct high frequency electrical signals or sensitive optical signals over long or short distances. To ensure proper transmission, installers handle the cables according to a set of rules.

One rule in handling cables is that short segments of a cable should not be bent in sharp angles. A sharply bent cable degrades the quality of the signals conducted by the cable. Cable installers use a manufacturer-specified minimum bend radius as a rule when installing cables. The minimum bend radius is the radius of an arc formed by a minimum length of cable that can be bent in a ninety degree angle without degrading the signal conducted by the cable.

Optical signals in fiber optic cables and RF signals in coaxial cables are especially vulnerable to improper cable bends. Cables can easily be unintentionally bent beyond their minimum bend radius. Cables are especially susceptible to bend radius violations at their ends. Connectors terminate each end of a cable. The installer typically plugs each connector into a network device. Typically, the network device is installed in a rack. Cables connecting to the network device typically approach the network device from either the top or the bottom of the rack. As the cable approaches the device the cable makes a ninety degree bend and then plugs into the face of the network device.

If the ninety degree bend sharp, violating the minimum bend radius for the cable, signal degradation results. Cable guides can ensure that the ninety degree bend in the cable has a bend radius greater than the manufacturer-specified minimum bend radius for the cable. Conventional cable guides are curved plastic or metal devices that surround the cable and prevent the cable from being bent beyond the minimum bend radius.

Installing a conventional cable guide typically requires access to one end of the cable to thread the cable through the cable guide. Obtaining access to one end of the cable requires disconnecting the cable from the network device. However, disconnecting the cable from the network device is typically undesirable since the disconnection may cause a network outage.

Typically, a plurality of connectors plug into a network device. As a result, the front panel of the network device is crowded with connectors, cables, and cable guides. When connecting or disconnecting an additional cable to the front panel of the network device, an installer moves cables already connected to the front panel out of the way without disconnecting them to get access to the point on the front panel of the network device where the additional cable needs to be connected.

Conventional cable guides typically do not rotate freely around the cable the cable guide is installed on. As a result, cables protected by conventional cable guides are not easily rotated or moved out of the way when connecting an additional cable to the network device. Since conventional cable guides are not easily rotated, the installer may need to disconnect certain cables to get access to the front panel of the network device without damaging existing connected cables.

From the foregoing discussion, it should be apparent that a need exists for a cable guide and system that maintains a desired bend radius. Beneficially, such a cable guide and system would not require a access to the end of the cable while installing the cable guide. Additionally, the cable guide would rotate freely around the cable.

SUMMARY OF THE INVENTION

The present invention has been developed in response to the present state of the art, and in particular, in response to the problems and needs in the art that have not yet been fully solved by currently available cable guides. Accordingly, the present invention has been developed to provide a cable guide and system for maintaining a desired bend radius that overcome many or all of the above-discussed shortcomings in the art.

A cable guide for maintaining a desired bend radius includes two substantially curved tube halves. Each tube half includes a curved portion. The curved portion has a predetermined radius. A hinge joins the tube halves and a fastening member fastens the tube halves together in a closed configuration. A first end of each of the tube halves is shaped to adhere to a cable connector. The cable connector terminates a cable.

The tube halves have an open configuration and a closed configuration. When in the closed configuration, a tubular sleeve is formed by the fastened tube halves. A cable may extend through a lumen of the tubular sleeve.

In one embodiment of the cable guide, the first end of each of the tube halves is shaped to conformably adhere to the cable connector terminating a cable. In another embodiment, the fastening member is further configured to align the tube halves and releasably fasten the tube halves together. In another embodiment, the tubular sleeve is further configured to allow the cable to freely extend through the lumen of the tubular sleeve.

Preferably, the fastening member of the cable guide enables the installation of the tubular sleeve around the cable without requiring access to an end of the cable. In another embodiment of the cable guide, the fastening member comprises a void in one of the tube halves and a boss attached to the other tube half. The boss on one tube half is sized to fit within the void on the other tube half.

In a further embodiment of the cable guide, the hinge joining the tube halves and the tube halves themselves comprise a single part. The single part is formed from plastic. The hinge integrally joins the tube halves together. In one embodiment, the curved portion of each tube half spans an angle of about ninety degrees. The radius of the curved portion of each tube half forms a minimum bend radius for the cable.

Preferably, the cable comprises a fiber optic cable or a coaxial cable. Preferably, the fiber optic cable is terminated with an FC, SC, LC, ST, or MT-RJ cable connector. In one embodiment, the tubular sleeve of the cable guide is rigid has a continuous surface.

A system for maintaining a desired bend radius includes a cable, a connector installed on an end of the cable, and a cable guide. The cable guide includes two tube halves, a hinge integrally joining the tube halves, and a fastening member. Each tube half has a straight portion and a curved portion. The curved portion has a predetermined radius and spans an angle of about ninety degrees.

The fastening member aligns and releasably fastens the tube halves together around the cable. The tube halves may be fastened together without requiring access to the end of the cable. The fastening member includes a void in one of the tube halves and a boss attached to the other tube half. The boss on one tube half is sized to fit within the void of the other tube half.

A first end of each of the tube halves is shaped to adhere to the connector. The tube halves have an open configuration and a closed configuration. When the tube halves are in the closed configuration a tubular sleeve is formed. The tubular sleeve has a lumen through which the cable may freely extend.

In one embodiment of the system, the hinge and the tube halves comprise a single part. The hinge integrally joins the straight portions of the tube halves together. Preferably, the cable is a fiber optic cable or a coaxial cable. In an alternate embodiment of the system, the first end of each of the tube halves is shaped to conformably adhere to the connector. In another embodiment of the system, the straight portion of the tubular sleeve is rotatably coupled to the curved portion of the tubular sleeve.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1A is a top view of one embodiment of a cable guide in an open configuration in accordance with the present invention;

FIG. 1B is a side view of one embodiment of a cable guide in an open configuration in accordance with the present invention;

FIG. 1C is a perspective side view of one embodiment of a cable guide in a closed configuration in accordance with the present invention;

FIG. 2A is a perspective end view of one embodiment of a cable guide in a closed configuration having an end shaped to adhere to a cable connector in accordance with the present invention;

FIG. 2B is a perspective end view of one embodiment of a cable guide in a closed configuration having an end shaped to conformably adhere to a cable connector in accordance with the present invention;

FIG. 2C is a top view of one embodiment of a cable guide in a closed configuration in accordance with the present invention;

DETAILED DESCRIPTION OF THE INVENTION

Figure 3A:
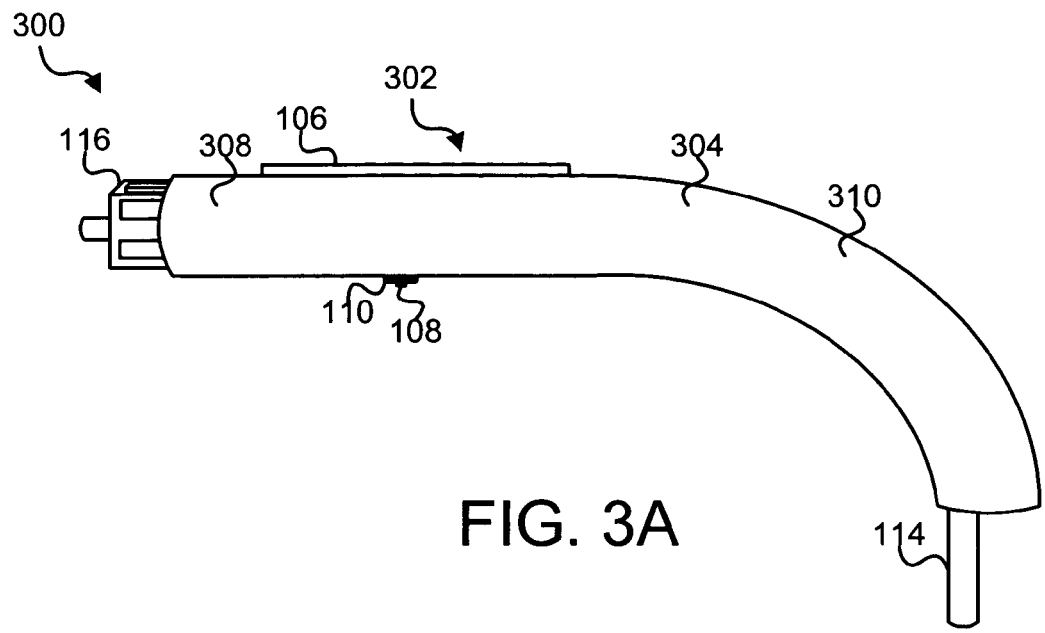
FIG. 3A is a perspective side view of a system for maintaining a desired bend radius in accordance with the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to enable a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1A depicts a top view of one embodiment of a cable guide 100 for maintaining a desired bend radius. The cable guide 100 comprises two substantially curved tube halves 102,104, a hinge 106, and a fastening member 108,110. Each tube half 102,104 comprises a curved portion having a predetermined radius. The hinge 106 joins the tube halves 102,104 and enables the tube halves 102,104 to be in an open configuration or a closed configuration.

In the open configuration, the tube halves 102,104 do not make contact with each other except at the hinge 106. In the closed configuration the tube halves 102,104 make contact with each other and form a tubular sleeve. In one embodiment, the tubular sleeve has a continuous surface free from voids. The cable guide 100 depicted in FIG. 1A is in the open configuration.

The fastening member 108,110 fastens the tube halves 102,104 together when the tube halves 102,104 are in the closed configuration. In one embodiment, the fastening member 108,110 comprises a boss 108 and a tab 110. The boss 108 protrudes from the side of the tube half 102 opposite the hinge 106. The tab 110 is located opposite the hinge 106 on the side of the other tube half 104.

While the cable guide 100 may be formed from various materials, in a preferred embodiment the cable guide 100 is formed from rigid plastic so that the cable guide 100 is lightweight, durable, and inexpensive. Alternatively, the cable guide 100 may be formed from other rigid or semi-rigid materials such as metal, ceramic, man-made composites, or the like.

FIG. 1B illustrates a side view of the cable guide 100 in the open configuration. The boss 108 depicted in FIG. 1B extends out from the side of the tube half 102 in a direction perpendicular to the page. In one embodiment, one side of each tube half 102,104 may comprise a substantially trough shaped void 112. When in the closed configuration, the trough shaped voids 112 of the tube halves 102,104 join together to form a tubular sleeve.

FIG. 1C illustrates a perspective side view of the cable guide 100 in the closed configuration. The cable guide 100 surrounds a cable 114. A connector 116 terminates one end of the cable 114. The cable 114 may comprise fiber optic cable or coaxial copper cable. The connector 116 may comprise a FC, SC, LC, ST, or MT-RJ connector 116.

The following method is used to install the cable guide 100 around the cable 114 and connector 116. First, an installer places the cable guide 100 in the open configuration. Next, the installer places the cable 114 in the trough shaped void 112 of one of the tube halves 102,104 such that the connector 116 is placed with a portion of the connector 116 inside the tube half 102,104 and the remainder of the connector 116 protruding outside the tube half 102,104.

Next, the installer folds the cable guide 100 along the hinge 106 so that the tube halves 102,104 are in the closed configuration. In the closed configuration, the tubular sleeve formed by the trough shaped voids 112 of the tube halves 102,104 surrounds a portion of the cable 114 and grips the connector 116. Finally, the fastening member 108,110 connects the tube halves 102,104 together, keeping the tube halves 102,104 in the closed configuration.

Following the method described above, an installer may install the cable guide 100 on a cable 114 already connected to a network device. The installer may install the cable guide 100 without having to disconnect the cable 114 from the network device to gain access to the end of the cable 114.

FIG. 2A illustrates the cable guide 100 in the closed configuration from a perspective end view. When in the closed configuration, the tube halves 102,104 form a tubular sleeve. A lumen 200 of the tubular sleeve has an inner diameter sized such that the tubular sleeve that makes contact with the connector 116 when the installer closes the tube halves 102,104 around the connector 116.

In this manner, a first end 202 of the cable guide 100 is shaped to adhere to the connector 116. The diameter of the lumen 200 may be chosen so as to allow the cable guide 100 to rotate around the connector 116. However, the cable guide 100 maintains enough contact with the connector 116 that the cable guide 100 will not easily slide off the connector 116 and down the cable 114.

In one embodiment, the fastening member 108,110 aligns the tube halves 102,104 as the installer pivots the tube halves 102,104 from the open configuration to the closed configuration. When correctly positioned, the tube halves 102,104 completely overlap each other lengthwise. The fastening member 108,110 aligns the tube halves 102,104 by preventing the tube halves 102,104 from making contact with each other in an incorrect position.

In yet another embodiment, the fastening member 108, 110 releasably fastens the tube halves 102,104 together. The installer may place the tube halves 102,104 in the closed configuration and fasten the tube halves 102,104 together. The install may then release the fastening member 108,110 and separate the tube halves 102,104, placing them in the open configuration.

The fastening member 108,110 allows the halves 102,104 to be fastened and unfastened repeatedly. The ability to releasably fasten the tube halves 102,104 enables the installer to install the cable guide 100 on a first cable. Some time later the installer may then uninstall the cable guide 100 from the first cable 114 and install the cable guide 100 on a second cable 114.

In a further embodiment of a cable guide 100, the fastening member 108,110 comprises a void 204 in a tab 110 protruding from one of the tube halves 104 and a boss 108 attached to the other tube half 102. The boss 108 fits within the void 204. The tab 110 is somewhat flexible so the installer may deflect the tab 110 over the boss 108.

As an installer brings the tube halves 102,104 into the closed configuration, the installer aligns the void 204 in the tab 110 with the boss 108 so that the boss 108 fits through the void 204. The installer then deflects the tab 110 toward the tube half 102 and over the boss 108 so that the tube halves 102,104 remain in the closed configuration. The installer may put the tube halves 102,104 back in the open configuration by deflecting the tab 110 away from the tubular sleeve and disengaging the boss 108 from the void 204. The installer then pivots the tube halves 102,104 away from each other into the open configuration. Those of skill in the art will recognize that other fastening members 108,110 such as hook and loop fasteners, glue, snaps, and the like could fasten the tube halves 102,104 together.

In one embodiment, the lumen 200 of the cable guide 100 has a diameter larger than the diameter of the cable 114 so that the cable 114 may move freely within the lumen 200. The ability for the cable 114 to move within the lumen 200 enables an installer to rotate the cable guide 100 without crimping or damaging the cable 114.

In a further embodiment, the hinge 106 and the tube halves 102,104 comprise a single part formed from plastic. The hinge 106 integrally joins the tube halves 102,104 together. A single injection of plastic into an injection mold may form the entire cable guide 100 as a single part.

FIG. 2B depicts one embodiment of a cable guide 206 in the closed configuration from a perspective end view. A void 210 of a first end 208 of the cable guide 206 conformably adheres to a connector 116 terminating a cable 114. The void 210 is formed when the tube halves 102,104 are in the closed configuration. The void 210 is shaped to conformably surround the dimensions of a particular connector 116. For example, the void 210 may be rectangular with dimensions that conformably surround an LC connector 116 for a fiber optic cable 114. Of course the void 210 could be square, rectangular, polygonal, or otherwise shaped.

FIG. 2C illustrates a top view of one embodiment of a cable guide 100 in the closed configuration. The curved tube half 102 spans an angle 212 of about ninety degrees. The radius 214 of the curved tube half 102 is chosen to be greater than or equal to a predetermined minimum bend radius.

The minimum bend radius may vary with the diameter of the cable 114. Accommodating a plurality of cables 114, each having a different minimum bend radius, may require a plurality of cable guides 100. Each of the plurality of cable guides 100 may comprise curved tube halves 102,104 with a different predetermined radius 214.

FIG. 3A illustrates a perspective view of a system 300 for maintaining a desired bend radius. The system 300 comprises a cable 114, a connector 116 installed on an end of the cable 114, and a cable guide 302. The cable 114 may comprise a fiber optic cable or a coaxial copper cable. The connector 116 may comprise a FC, SC, LC, ST, or MT-RJ connector 116.

Figure 3B:
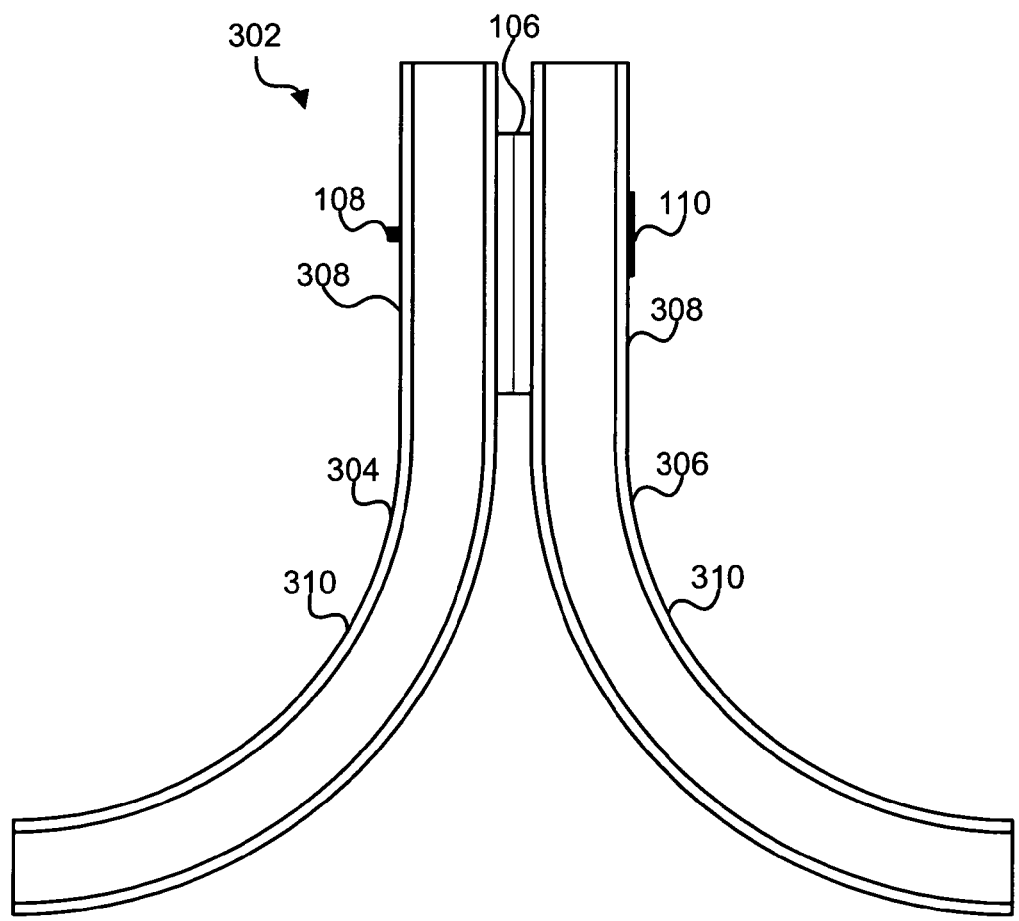
FIG. 3B is a top view an alternate embodiment of a cable guide in an open configuration in accordance with the present invention.

Referring now to FIG. 3B, the cable guide 302 includes two substantially curved tube halves 304,306. Each tube half 304,306 comprises a straight portion 308 and a curved portion 310. The curved portion 310 has a predetermined radius 214 and may span an angle 212 of about ninety degrees. The tube halves 304,306 may be placed in an open configuration or a closed configuration. In the closed configuration, the tube halves 304,306 form a tubular sleeve.

A hinge 106 integrally joins the tube halves 304,306. A fastening member 110,108 aligns the tube halves 304,306 in a closed configuration in substantially the same manner as described above in relation to FIG. 2A. In one embodiment, the hinge 106 and the tube halves 304,306 comprise a single part. The hinge 106 integrally joins the straight portions 308 of the tube halves 304,306 together.

Figure 4A:
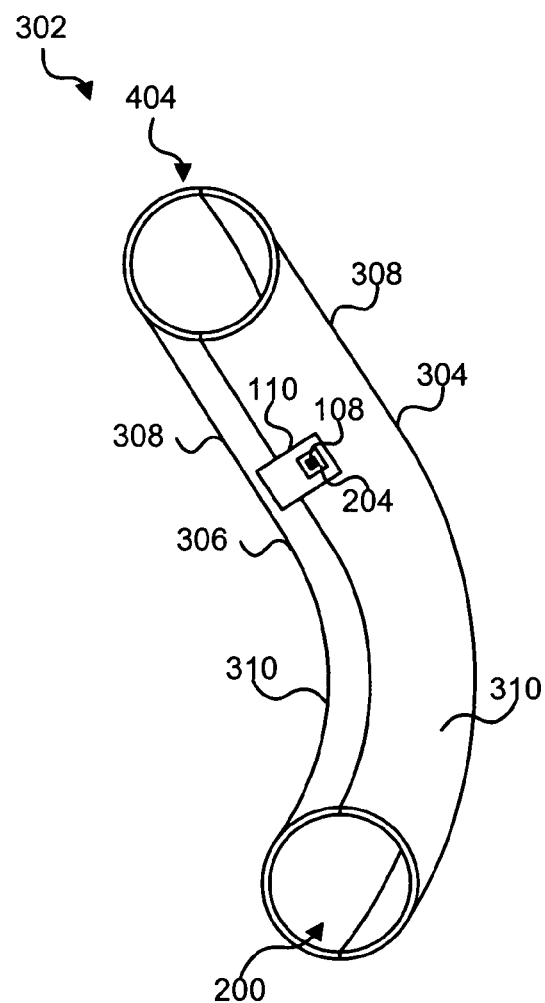
FIG. 4A is a perspective end view of an alternate embodiment of a cable guide in a closed configuration having an end shaped to adhere to a cable connector in accordance with the present invention.

FIG. 4A illustrates the cable guide 302 in the closed configuration from a perspective end view. The tube halves 304,306 in the closed configuration form a tubular sleeve. The tubular sleeve has a lumen 200 through which the cable 114 may freely extend.

The fastening member 110,108 releasably fastens the tube halves 304,306 together in a closed position. The installer may release the fastening member 110,108 to return the tube halves 304,306 to an open position. The fastening member 110,108 comprises a void 204 in a tab 110 protruding from one of the tube halves 306 and a boss 108 attached to the other tube half 304. The boss 108 fits within the void 204. The boss 108 and the void 204 fasten the tube halves 304,306 together in substantially the same manner as described above in relation to FIG. 2A.

A first end 404 of each of the tube halves 304,306 adheres to the connector 116. The first end 404 makes contact with the connector 116 in substantially the same manner as described above in relation to FIG. 2A.

Figure 4B:
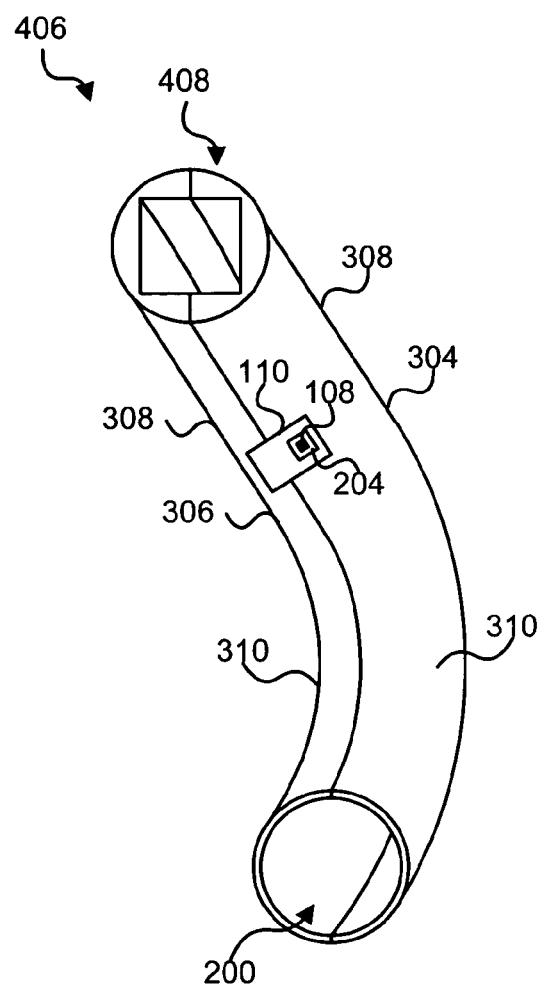
FIG. 4B is a perspective end view of an alternate embodiment of a cable guide in a closed configuration having an end shaped to conformably adhere to a cable connector in accordance with the present invention.

FIG. 4B illustrates a perspective end view of one embodiment of a cable guide 406. A first end 408 of each of the tube halves 304,306 conformably adheres to a connector 116 in substantially the same manner as describe above in relation to FIG. 2B.

Figure 5:
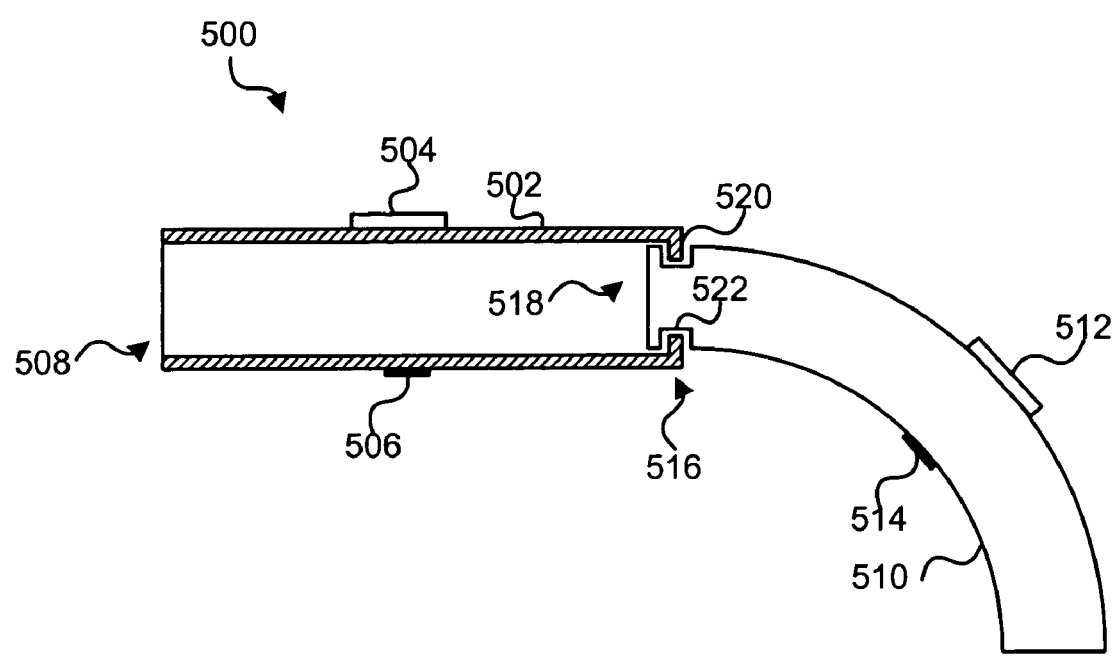
FIG. 5 is a partial cross section side view of an alternate embodiment of a cable guide in a closed configuration in accordance with the present invention.

FIG. 5 illustrates a partial cross section side view of one embodiment of a cable guide 500. A straight tubular sleeve 502 comprises two tubular halves joined by a hinge 504 and a fastening member 506. A first end 508 of the straight tubular sleeve 502 may conformably adhere to a connector 116 in substantially the same manner as described above. A curved tubular sleeve 510 comprises two tubular halves joined by a hinge 512 and a fastening member 514.

A second end 516 of the straight tubular sleeve 502 is rotatably coupled to a first end 518 of the curved tubular sleeve 510. In one embodiment, a lip 520 of the straight tubular sleeve 502 encircles a groove 522 in the curved tubular sleeve 510. The lip 520 and groove 522 are sized so that the curved tubular sleeve 510 rotates freely with respect to the straight tubular sleeve 502.

The rotatable coupling between the straight tubular sleeve 502 and curved tubular sleeve 510 is useful for cable installers. The rotatable coupling allows an installer to rotate the curved tubular sleeve 510 of a cable guide 500 while protecting an existing cable 114 connected to a network device. Rotating the curved tubular sleeve 510 is useful when connecting additional cables to a network device already crowded with existing cables.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cable guide for maintaining a desired bend radius, the cable guide comprising:

two substantially curved tube halves, each tube half comprising a curved portion having a predetermined radius;

a hinge joining the tube halves;

a fastening member configured to fasten the tube halves together;

a first end of each of the tube halves comprising a circumferential groove disposed on the exterior surface of the tube halves;

a second end of each of the tube halves comprising a lip protruding inward toward an axis of the tube, the lip configured to encircle a circumferential groove of a first end of a second cable guide so that the second cable guide is rotatably coupled to the cable guide; and the tube halves having an open configuration and an adjoining closed configuration wherein when in the closed configuration a tubular sleeve is formed by the fastened tube halves, the tubular sleeve comprising a lumen through which a cable may extend.

2. The cable guide of claim 1, wherein the first end of each of the tube halves is shaped to conformably adhere to a cable connector terminating a cable.

3. The cable guide of claim 1, wherein the fastening member is further configured to align the tube halves and releasably fasten the tube halves together.

4. The cable guide of claim 1, wherein the tubular sleeve is further configured to allow the cable to freely extend through the lumen.

5. The cable guide of claim 1, wherein the fastening member enables the installation of the tubular sleeve around the cable without requiring access to an end of the cable.

6. The cable guide of claim 1, wherein the fastening member comprises a void in one of the tube halves and a boss attached to the other tube half, and wherein the boss is sized to fit within the void.

7. The cable guide of claim 1, wherein the hinge and the tube halves comprise a single part formed from plastic, the hinge integrally joining the tube halves together.

8. The cable guide of claim 1, wherein the curved portion of each tube half spans an angle of about ninety degrees and the radius of the curved portion comprises a minimum bend radius for the cable.

9. The cable guide of claim 1, wherein the cable comprises a cable selected from the group consisting of fiber optic cable and coaxial cable.

10. The cable guide of claim 2, wherein the cable connector comprises a connector selected from the group consisting of FC, SC, LC, ST, and MT-RJ.

11. The cable guide of claim 1, wherein the tubular sleeve is rigid and the surface of the tubular sleeve is continuous.

12. A system for maintaining a desired bend radius, the system comprising:
- a cable;
- a connector installed on an end of the cable;
- a cable guide including;
  - two substantially curved tube halves, each tube half comprising a straight portion and a curved portion wherein the curved portion has a predetermined radius and the curved portion spans an angle of about ninety degrees;
  - a hinge integrally joining the tube halves;
  - a fastening member configured to align and releasably fasten the tube halves together around the cable without requiring access to the end of the cable, the fastening member comprising a void in one of the tube halves and a boss attached to the other tube half wherein the boss is sized to fit within the void;
  - a first end of each of the tube halves comprising a circumferential groove disposed on the exterior surface of the tube halves;
- a second end of each of the tube halves comprising a lip protruding inward toward an axis of the tube, the lip configured to encircle a circumferential groove of a first end of a second cable guide so that the second cable guide is rotatably coupled to the cable guide; and
- the tube halves having an open configuration and an adjoining closed configuration wherein when in the closed configuration a tubular sleeve is formed by the fastened tube halves, the tubular sleeve comprising a lumen through which the cable may freely extend.

13. The system of claim 12, wherein the hinge and the tube halves comprise a single part, the hinge integrally joining the straight portions of the tube halves together.

14. The system of claim 12, wherein the cable comprises a cable selected from the group consisting of fiber optic cable and coaxial cable.

15. The system of claim 12, wherein the first end of each of the tube halves is shaped to conformably adhere to a connector.

16. The system of claim 12, wherein a straight portion of the tubular sleeve is rotatably coupled to a curved portion of the tubular sleeve.

17. A cable guide for maintaining a desired bend radius, the cable guide comprising:
- two tube halves, each tube half comprising a means for preventing a cable from bending beyond a predetermined radius;
- means for joining the tube halves;
- means for fastening the tube halves together;
- means for circumferential retaining disposed on a first end of each of the tube halves;
- means for rotatably coupling to the circumferential retaining means disposed on a second end of each of the tube halves, the rotatably coupling means configured to encircle a circumferential retaining means of a first end of a second cable guide so that the second cable guide is rotatably coupled to the cable guide;
- the tube halves having an open configuration and an adjoining closed configuration wherein when in the closed configuration a tubular sleeve is formed by the fastened tube halves, the tubular sleeve comprising a means for extending the cable through the tubular sleeve.

18. The cable guide of claim 17, wherein the means for fastening enables the installation of the tubular sleeve around the cable without requiring access to an end of the cable.

19. The cable guide of claim 17, wherein the means for joining and the tube halves comprise a single part.

20. The cable guide of claim 17, wherein the radius comprises a minimum bend radius for the cable.

* * * * *